United States Patent
Canedo Rodriguez et al.

(10) Patent No.: US 11,573,285 B2
(45) Date of Patent: Feb. 7, 2023

(54) POSITIONING METHODS AND SYSTEMS

(71) Applicant: SITUM TECHNOLOGIES, S.L., Santiago de Compostela (ES)

(72) Inventors: Adrian Canedo Rodriguez, Santiago de Compostela (ES); Victor Álvarez Santos, Santiago de Compostela (ES); Cristina Gamallo Solórzano, Santiago de Compostela (ES)

(73) Assignee: SITUM TECHNOLOGIES, S.L., Santiago de Compostela (ES)

( * ) Notice: Subject to any disclaimer, the term of this patent is extended or adjusted under 35 U.S.C. 154(b) by 187 days.

(21) Appl. No.: 16/964,933

(22) PCT Filed: Mar. 23, 2018

(86) PCT No.: PCT/EP2018/057532
§ 371 (c)(1),
(2) Date: Jul. 24, 2020

(87) PCT Pub. No.: WO2019/145054
PCT Pub. Date: Aug. 1, 2019

(65) Prior Publication Data
US 2021/0041521 A1 Feb. 11, 2021

(30) Foreign Application Priority Data
Jan. 26, 2018 (EP) .................................. 18382045

(51) Int. Cl.
*G01S 3/02* (2006.01)
*G01S 5/02* (2010.01)

(52) U.S. Cl.
CPC .......... *G01S 5/0278* (2013.01); *G01S 5/0264* (2020.05); *G01S 5/0263* (2013.01); *G01S 5/0268* (2013.01); *G01S 5/02685* (2020.05)

(58) Field of Classification Search
CPC ........ G01S 19/246; G01S 19/21; G01S 19/22; G01S 19/243; G01S 19/254; G01S 19/37;
(Continued)

(56) References Cited

U.S. PATENT DOCUMENTS

| 7,525,484 B2 | 4/2009 | Karr, Jr. et al. |
| 8,174,447 B2 * | 5/2012 | Loidl ................... G01C 21/206 342/451 |

(Continued)

OTHER PUBLICATIONS

International Search Report and Written Opinion of the International Searching Authority. International Application No. PCT/EP2018/057532 issued by the European Patent Office, dated Dec. 14, 2018, 20 pages, Rijswijk, Netherlands.

*Primary Examiner* — Chuong P Nguyen
(74) *Attorney, Agent, or Firm* — Peter B. Scull; EIP US LLP

(57) ABSTRACT

Methods are provided for determining a positioning of a portable device including first and second sensor(s) each having a confidence. These methods include: receiving first and second signals from the first and second sensor(s), respectively; generating positional data representing positional conditions of the portable device and including first and second positional data respectively from the first and second signals, by modelling the received signals based on predefined models defining a correspondence between predefined signals and predefined positional data; comparing the first and second positional data to determine a difference between them; adjusting the confidence of the sensors by determining a new confidence depending on a previous confidence and the determined difference between positional data; weighting the generated positional data depending on corresponding confidences; and determining the positioning of the portable device based on the weighted generated positional data. Computer programs and systems suitable for performing such methods are also provided.

20 Claims, 2 Drawing Sheets

(58) Field of Classification Search
CPC .... G01S 5/0264; G01S 5/0268; G01S 5/0278; G01S 5/02685; G01S 5/0263
USPC .... 342/451, 357.59, 357.61, 357.63, 357.64, 342/357.77
See application file for complete search history.

(56) References Cited

U.S. PATENT DOCUMENTS

| | | | | |
|---|---|---|---|---|
| 8,738,035 | B1* | 5/2014 | Ramakrishnan | G01S 19/48 342/451 |
| 8,933,841 | B2* | 1/2015 | Valaee | H04W 64/00 342/357.31 |
| 8,994,590 | B2* | 3/2015 | Jarvis | G01S 5/14 342/451 |
| 10,091,622 | B2* | 10/2018 | Elias | H04W 4/029 |
| 10,190,881 | B2* | 1/2019 | Yuan | G01C 21/206 |
| 10,244,358 | B2* | 3/2019 | Elias | G01C 22/006 |
| 10,254,379 | B2* | 4/2019 | Sendonaris | G01S 5/0252 |
| 10,837,794 | B2* | 11/2020 | Omr | G16H 20/30 |
| 2008/0234935 | A1* | 9/2008 | Wolf | A61B 5/024 701/472 |
| 2015/0247918 | A1* | 9/2015 | Zhang | G01S 5/0263 342/451 |
| 2015/0319577 | A1 | 11/2015 | Brunner et al. | |
| 2016/0169703 | A1 | 6/2016 | Omr et al. | |
| 2018/0356492 | A1* | 12/2018 | Hamilton | G01S 5/0242 |

* cited by examiner

POSITIONING METHODS AND SYSTEMS

The present disclosure relates to methods for determining a positioning of a portable device, and to computer programs, systems and computing systems suitable for performing such "positioning" methods. The present disclosure further relates to portable devices including such "positioning" (computing) systems.

BACKGROUND

A diversity of positioning methods and systems implemented in portable devices are known. These positioning methods/systems may be based on processing sensor signals from sensors configured to sense wireless signals from the environment and/or physical conditions of the portable device and variations thereof. For example, satellite signals, Wi-Fi signals, Bluetooth signals, etc. may be considered to infer corresponding position(s) and/or motion(s) of the portable device. These "wireless" signals may be sensed by corresponding "wireless" sensors and processed by corresponding processor to derive the positioning, i.e. position(s) and/or motion(s), of the portable device.

Other measurements representing physical conditions of the portable device may be considered to infer the positioning of the portable device. For instance, accelerometers, gyroscopes, barometers, etc. may be employed to this end. Accelerometers may be used to measure accelerations and variations thereof experienced by the portable device or by a movable entity (person, vehicle, etc.) carrying the portable device. Gyroscopes are configured to measure orientation and angular velocity and variations thereof experienced by the portable device or corresponding movable entity. Barometers are configured to measure atmospheric pressure and variations thereof.

However, the sensors from which the positioning may be derived may become damaged or simply produce distorted signals due to e.g. undesired/unexpected environmental circumstances. These anomalies may lead to erroneous positioning results which may be imperceptible to a corresponding user of the portable device or even "catastrophic" depending on their gravity. For example, inaccurate acceleration signals from accelerometer(s), distorted wireless signals from Wi-Fi and/or Bluetooth sensor(s), etc. may result in erroneous positioning determination of the portable device. Another source of bad positioning results may be e.g. the appearance and/or disappearance of Wi-Fi/Bluetooth access points/beacons which are unknown to the positioning system of the portable device. In this case, "unexpected" wireless signals and intensities thereof may induce incorrectness in positioning results.

Nowadays, it may be preferred to avoid or at least attenuate as much as possible the above distortions and/or malfunctions, so as to ensure reasonably accurate positioning results of the portable device.

An aspect of the present disclosure is thus improving prior positioning methods and systems for determining a positioning of a portable device.

SUMMARY

In an aspect, a method is provided for determining a positioning of a portable device including a plurality of sensors including first one or more sensors and second one or more sensors, each of the sensors in the plurality of sensors having a confidence.

The "positioning" method includes receiving sensor signals from the plurality of sensors, said sensor signals including first sensor signals from the first one or more sensors and second sensor signals from the second one or more sensors.

The positioning method further includes modelling the received sensor signals based on predefined models including signal models defining a correspondence between predefined (input) sensor signals and predefined (output) positional data. This modelling thus generates positional data including first and second positional data respectively (generated) from the first and second sensor signals, and said generated positional data representing (one or more) positional conditions of the portable device.

The positioning method still further includes comparing the first positional data with the second positional data to determine a difference (or deviation) between the first and second positional data.

The positioning method yet further includes adjusting, for each of the first and second one or more sensors, the confidence of the corresponding sensor by determining a new confidence value depending on a previous confidence value of the sensor and the determined deviation (or difference) between the first and second positional data.

The positioning method furthermore includes weighting the generated positional data depending on the confidences of the corresponding sensors in the plurality of sensors, and determining the positioning of the portable device based on the weighted generated positional data.

The positioning method hereof may provide a continuous self-calibration of a corresponding positioning (computing) system performing said method, in the sense that the influence of sensor signals in positioning results is selectively promoted or demoted depending on (positional) data generated by the method itself. Positional data (e.g. positions, trajectories, orientations, etc.) derived from corresponding sensor signals are thus used to perform a double function including both self-calibration and production of positioning results. An underlying principle of a method hereof may rely on comparing positional data inferred from different sensors which may be of same or different type. The influence (i.e. confidence and corresponding weight) of said different sensors in positioning results is varied depending on whether said comparison denotes higher or lower deviation (or difference) and the current confidence of the participating sensors. For example, if the comparison denotes high deviation and one of the sensors has current confidence higher than the other sensors, the confidence (and corresponding weight in positioning results) of said other sensors may be accordingly reduced. Said decrease may be e.g. proportional to the detected deviation between positional data from said different sensors.

Many other ways of adjusting sensor confidences are described in detail in other parts of the description. In particular, detailed descriptions are provided in other parts of the disclosure about "matching-level", "series-coherence" and "positional-comparison" approaches, which constitute innovative and powerful ways of performing the proposed (continuous and self-) adjustment of sensor confidences.

Positional conditions represented by positional data resulting from modelling sensor signals may refer to any motional and/or locational state of the portable device, such as e.g. positions, orientations, walking steps, trajectories, displacements, advances, etc. experienced by the portable device.

In a further aspect, a computer program is provided including program instructions for causing a computing system to perform any of the previous positioning methods of determining a positioning of a portable device. This computer program may be embodied on a storage medium and/or carried on a carrier signal. Since this computer program is suitable for performing the above positioning methods, same or similar principles and advantages as those disclosed with respect to the methods may be attributed to the computer programs.

In a still further aspect, a computing system may be provided for determining a positioning of a portable device, the computing system including a memory and a processor, embodying instructions stored in the memory and executable by the processor, the instructions including functionality to execute any of the previous positioning methods of determining a positioning of a portable device. Since this computing system is suitable for performing the above positioning methods, same or similar principles and advantages as those disclosed with respect to the methods may be attributed to the computing systems.

In a yet further aspect, a "positioning" system may be provided for determining a positioning of a portable device including a plurality of sensors including first one or more sensors and second one or more sensors, each of the sensors in the plurality of sensors having a confidence. This positioning system includes a signal receptor, a signal modeller, a confidence adjustor and a combiner.

The signal receptor (module) is configured to receive sensor signals from the plurality of sensors, said sensor signals including first sensor signals from the first one or more sensors and second sensor signals from the second one or more sensors.

The signal modeller (module) is configured to model the received sensor signals based on predefined models including signal models defining a correspondence between predefined (input) sensor signals and predefined (output) positional data. This modelling generates positional data including first and second positional data respectively (generated) from the first and second sensor signals, and said generated positional data representing (one or more) positional conditions of the portable device.

The confidence adjustor (module) is configured to compare the first positional data with the second positional data to determine a difference (or deviation) between the first and second positional data. The confidence adjustor is further configured to adjust, for each of the first and second one or more sensors, the confidence of the corresponding sensor by determining a new confidence value depending on a previous confidence value of the sensor and the determined difference between the first and second positional data.

And the combiner (module) is configured to weight the generated positional data depending on the confidences of the corresponding sensors in the plurality of sensors, and to determine the positioning of the portable device based on the weighted generated positional data.

Since this "positioning" system is suitable for performing the above positioning methods, same or similar principles and advantages as those disclosed with respect to said methods may be attributed to such "positioning" systems.

In a furthermore aspect, a portable device may be provided including any of the above positioning (computing) systems.

These and other advantages and features will become apparent in view of the detailed description and drawings.

BRIEF DESCRIPTION OF THE DRAWINGS

Non-limiting examples of the present disclosure will be described in the following, with reference to the appended drawings, in which.

DETAILED DESCRIPTION OF EXAMPLES

Figure 1:
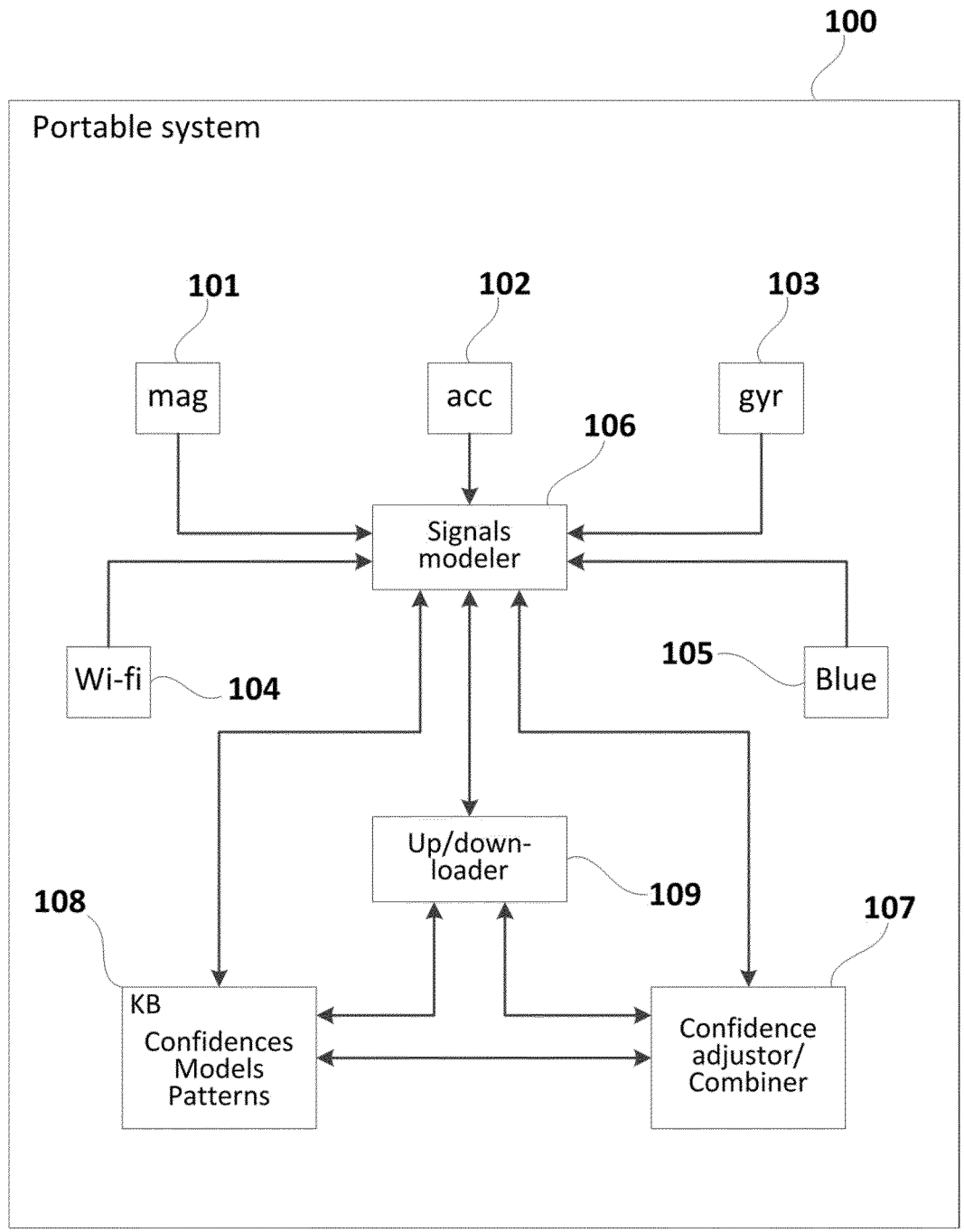
FIG. 1 is a block diagram schematically representing a portable system with positioning functionality according to examples.

FIG. 1 is a block diagram schematically representing a portable system/device according to examples, i.e. with positioning functionality implemented by corresponding positioning method(s). The portable device 100 may be any type of portable device having computing capabilities, memory capabilities to store corresponding software and data, along with sensor capabilities. In this sense, the portable device 100 may be e.g. a smartphone, a laptop, a tablet, smart-glasses, a smart-watch, a mini-computer with suitable sensors, a robot, a PCB with suitable processor, memory and sensors, and so on suitably configured to perform locational (or positioning) methods according to the present disclosure.

As shown in the figure, a portable system 100 according to the present disclosure may include various sensors, such as e.g. magnetometer 101, accelerometer 102, gyroscope 103, Wi-Fi sensor 104, Bluetooth sensor 105, etc. The portable device 100 may further include a positioning (computing) system including various modules, such as e.g. a (sensor) signal modeller 106, a confidence adjustor/combiner 107, a Knowledge Base (KB) 108, an Up/downloader of data 109, etc. The module confidence adjustor/combiner 107 may provide a double functionality: adjustment of confidences (in the KB 108) and combination of locational/positional data (from the modeller 106). Thus, said module may be referred to as confidence adjustor 107 or combiner 107 indistinctly depending on whether one or the other functionality is discussed. Sensor signals may be received from sensors 101-105 through a corresponding signal receptor module (not shown in the figure). The sensors 101-105 may be disposed in the positioning (computing) system or not.

As used herein, the term "module" may be understood to refer to software, firmware, hardware, and/or various combinations thereof. It is noted that the modules are exemplary. The modules may be combined, integrated, separated, and/or duplicated to support various applications. Also, a function described herein as being performed at a particular module may be performed at one or more other modules and/or by one or more other devices (associated to or with the portable device) instead of or in addition to the function performed at the described particular module.

Further, the modules may be implemented across multiple devices (associated to or with the portable device) and/or other components local or remote to one another. Additionally, the modules may be moved from one device and added to another device, and/or may be included in both devices (associated to or with the portable device). Any software implementations may be tangibly embodied in one or more storage media, such as, for example, a memory device, a floppy disk, a compact disk (CD), a digital versatile disk (DVD), or other devices that may store computer code.

The sensor signal modeller 106 may be configured to model sensor signals from any one of the sensors 101-105 based on predefined models (e.g. signal models) to produce positional (or locational) data from said sensor signals. This modelling may include e.g. comparing the sensor signals with signal models (or sub-models), and selecting the signal model (or sub-model) best matching the sensor signals. A verification of whether said best matching satisfies an acceptability condition may be then performed. If the matching is acceptable, positional data corresponding to the sensor signals may be produced according to the selected signal model or sub-model. Otherwise, either positional data with low confidence or no positional data may be produced. A signal sub-model may be defined herein as a part of a signal model that is divided in a plurality of sub-models each defining a particular correspondence between predefined sensor signal(s) and predefined positional data. As described in other parts of the present disclosure, an example of signal model may be a map of Wi-Fi or Bluetooth strengths (or intensities) in which different locations (or regions) of the map are qualified with particular strength(s) depending on e.g. its relative situation to/from Wi-Fi access points or Bluetooth beacons. This signal model (or map) may be divided in a plurality of signal sub-models each corresponding to a location or region of the map defining positional data to be outputted and having expected Wi-Fi strength(s) or range of strengths to be compared with inputted Wi-Fi or Bluetooth signals.

Locational or positional data may represent one or more positional conditions of the portable device 100, such as e.g. positions, orientations, walking steps, trajectories, displacements, etc. These data may be expressed according to a two-dimensional coordinate system (if positions/motions on a 2D plane are to be considered), a three-dimensional coordinate system (if positions/motions on a 3D space are to be considered), etc. 2D coordinates may be used to express positions/motions on a single floor, 3D coordinates may be used to express positions/motions (of the device) in a building with several floors, etc.

Locational (or positional) data may further represent e.g. a probability or confidence that the portable device 100 is at a particular position, trajectory, orientation, displacement, etc. In this case, positional data may include pairs including a first positional component indicating a position, trajectory, orientation, displacement, etc. and a second positional component indicating a probability or confidence of being at said position, trajectory, orientation, displacement, etc. First positional components may be expressed as 2D and/or 3D coordinates (as described before), and second positional components may be expressed as e.g. a percentage, a value within predefined scale, etc. For instance: in a scale between lower limit (e.g. 0) and upper limit (e.g. 10), lower limit may indicate minimum probability and upper limit may indicate maximum probability; in a percentage approach, 0% may indicate minimum probability and 100% may indicate maximum probability; etc.

A signal model (included in the predefined models) may define a correspondence (or equivalence) between (input) sensor signals and (output) positional data. For example, a signal model may include a map of Wi-Fi strengths or intensities wherein different locations (or regions) of the map are qualified with higher or lower strength(s) depending on e.g. its relative situation to/from Wi-Fi access points. This signal model (or map) may be seen as a plurality of sub-models each corresponding to a location or region of the map with attributed Wi-Fi strength or range of strengths. A sensed Wi-Fi strength (or intensity) acceptably matching a sub-model of the map may indicate that the portable device is located in corresponding location/region according to the model/map. In this case, the signal modeller 106 may output said location/region (or position) that corresponds to the inputted sensor signals according to the map. Instead of a location/region or position in the map, the signal modeller 106 may output a trajectory depending on inputted series of Wi-Fi signals sensed over time. A particular evolution of the strength of the Wi-Fi signals may correspond to a trajectory followed by the portable device according to the map of Wi-Fi strengths. Same or similar principles as those disclosed with respect to Wi-Fi signals may be considered in the case of Bluetooth signals. For example, a map of Bluetooth strengths may be used by the signal modeller 106 to produce positional data depending on Bluetooth signals sensed by the Bluetooth sensor 105.

The signal modeller 106 may further provide a pedometer or advance-meter functionality to detect and count (or measure) walking steps or displacements (or advances) performed by a user or any movable entity carrying the portable device 100. In this case, another type of predefined models that may be referred to as walking/displacement models may be used by the signal modeller 106 to detect walking steps or advances. A walking/displacement model may define execution of a walking step or advance depending on accelerometer signal(s), gyroscope signal(s), magnetometer signal(s), etc. In general, any type of sensor signals providing identifiable disturbances during walking or displacement/advance of a movable entity carrying the portable device 100 may be used for implementing the pedometer or advance-meter functionality. The modeller 106 may be configured to compare sensor signals from e.g. the accelerometer 102, gyroscope 103, magnetometer 101, etc. with predefined walking/displacement models and determine positional data including performed walking step(s) or advance(s) depending on said comparison.

A walking/displacement model may include e.g. an input condition (defined in terms of predefined signals) whose satisfaction may produce output positional data indicating whether a walking step or advance has been performed by the movable entity carrying the portable device 100. An input condition may represent e.g. whether acceleration (according to received acceleration signals) is above a predefined acceleration value and subsequently crosses zero value after an elapsed time that is below a predefined time value. If this condition is satisfied, the modeller 106 may conclude that the carrier of the portable device 100 has performed a walking step or a given advance. As described in other parts of the disclosure, walking/displacement models may be defined and updated based on e.g. machine learning technique(s).

Signals from the gyroscope 103, magnetometer 101 or another sensor of similar nature may be used to estimate orientation(s) of the movable entity (carrying the portable device 100) during displacement. In this sense, said type of sensors may be denominated herein as orientation sensors. Orientation models (another type of predefined models) may define an output predefined orientation depending on input predefined orientation sensor signals. The signal modeller 106 may thus provide an orientation followed by the movable entity depending on whether a given orientation model is (acceptably) matched by signals from orientation sensor(s). The signal modeller 106 may thus estimate orientations and, therefore, corresponding trajectories or displacements followed by the movable entity depending on detected orientations and detected walking steps or displacements.

As described before, the signal modeller 106 may also provide an advance (or displacement) measurement functionality to estimate movement advances (or displacements) of the portable device 100 in non-walking scenarios, such as e.g. when movement is due to any type of vehicle or transport, such as e.g. a wheelchair, conveyer belt, elevator, etc. This functionality may be similarly implemented as the pedometer functionality but based on models defining sensor signal behaviours in such non-walking scenarios. Said models may be referred to herein as advance models. Orientation models as defined before may also be used to estimate orientations in the advance measurement functionality, in a similar way as in the pedometer functionality. Estimated movement advances and orientations may be used to estimate trajectories, also similarly as described with respect to the pedometer functionality.

The Knowledge Base (KB) 108 may be configured to store any required data for performing positional (or locational) methods according to the present disclosure. The KB 108 may store any of the aforementioned predefined models, confidences associated to the sensors 101-105, etc. The KB 108 may be generally defined as a repository of those data defining the behaviour of the modeller 106 to produce positional data from sensor data. Predefined models may have been predefined depending on data previously captured during a calibration phase and/or during the normal functioning of the system. In particular, signal models may have been predefined from Wi-Fi and/or Bluetooth calibration(s) in a building. Walking, orientation, advance models may have been predefined depending on accelerometer, gyroscope and magnetometer signals captured during quotidian walking/movement by experimental users/vehicles, etc. The KB 108 may further include data defining an iterative adjustment of confidences which is described below.

Each of the sensors 101-105 may have an initial confidence that may have been empirically pre-determined depending on an estimated probability that the sensor fails or a certain level of malfunction occurs. For example, it may be considered more usual that a magnetometer becomes de-calibrated in comparison with a gyroscope. Hence, a lower confidence may be initially attributed to the magnetometer and a higher confidence to the gyroscope. Confidences may be adjusted throughout the operation of the portable device, so that the initial (predefined) confidences may result altered after certain time of operation. Confidences may be continuously or regularly adjusted during the operation of the device, or according to a predefined frequency, or when certain operation conditions occur, etc. The adjustment of confidences may be performed by the confidence adjustor 107, which may further provide a data entry functionality permitting manual update of confidences.

The confidence of a sensor may be adjusted according to different approaches or combinations thereof. In a first approach, the confidence adjustment may depend on a matching level between sensor signals from the sensor and corresponding predefined models (signal models in the form of e.g. Wi-Fi/Bluetooth maps, walking/orientation/advance models, etc.). This first approach may be herein referred to as "matching-level" approach.

In a second approach, the confidence adjustment may depend on whether signals from the sensor represent a coherent or incoherent series of values. This second approach may be herein referred to as "series-coherence" approach.

In a third approach, the confidence adjustment may depend on a comparison between "comparable" positional data derived from different sensors. This third approach may be herein referred to as "positional-comparison" approach.

The expression "comparable positional data" may be defined herein as positional data referring to the same (positional or motional) concept so that they may be effectively compared. For instance, trajectory data derived from accelerometer and trajectory data derived from Wi-Fi sensors are comparable to each other because they refer to the same positional/motional concept, even though their origin corresponds to different types of sensors. However, trajectory data and position data both derived from Wi-Fi sensors are not comparable to each other because they refer to different positional/motional concepts (trajectories vs positions), even though their origin may correspond to the same type of sensor.

In examples according to the matching-level approach, a low matching level between sensor signals from Wi-Fi sensor and corresponding Wi-Fi sub-models (in Wi-Fi map) may mean that e.g. the portable device is outside pre-calibrated (i.e. known) area, the sensor has been damaged, an unknown alteration in Wi-Fi network has occurred, etc. Then, since detected Wi-Fi signals do not acceptably correspond to any of the sub-models in the Wi-Fi map, it may be concluded that signals from Wi-Fi sensor are not reliable enough to be considered in positioning functionality. Therefore, the confidence of the Wi-Fi sensor may be decreased to a suitable extent such that its influence in positioning results is cancelled or minimized. On the contrary, if a high matching level between Wi-Fi signals and Wi-Fi sub-model(s) is determined, a corresponding increase (e.g. proportional to the matching level) in the Wi-Fi confidence may be induced. Same or similar principles as those described before with respect to Wi-Fi signals and their confidence may also be considered in the case of Bluetooth signals.

In further examples according to the matching-level approach, a low matching level between sensor signals from pertinent sensor and corresponding predefined models (e.g. walking, orientation, advance models) may mean that e.g. the portable device is moving in unknown conditions, the sensor has been damaged, etc. Then, since sensor signals do not acceptably correspond to any of the predefined models, it may be concluded that signals from the sensor are not reliable enough to be considered in the positioning functionality/method(s). Therefore, the confidence of the sensor may be decreased to a suitable extent such that its influence in positioning results is cancelled or minimized. On the contrary, if a high matching level between signals and corresponding predefined model is determined, a suitable increase (e.g. proportional to the matching level) in the confidence of the sensor may be induced.

In general, modelling the received sensor signals may include determining, for each of corresponding sensors, which of the predefined (signal) models best matches the signals from the sensor depending on a comparison between said signals and the predefined sensor signals of corresponding predefined (signal) models. Then, a matching level or magnitude of said best matching predefined model may be determined, and corresponding confidence(s) may be adjusted further depending on said matching level. For example, if the matching level is within predefined matching acceptability range, an increase may be induced in corresponding confidence(s). Otherwise (matching level outside acceptability range), a decrease may be induced in corresponding confidence(s). The higher the matching level within matching acceptability range is, the higher may be the induced increase; and the lower the matching level within matching acceptability range is, the lower may be the induced increase. The higher the matching level outside matching acceptability range is, the lower may be the induced decrease; and the lower the matching level outside matching acceptability range is, the higher may be the induced decrease.

As a general principle, positioning methods (according to present disclosure) may include verifying, for each of the corresponding sensors, whether the confidence of the sensor is within or outside predefined confidence acceptability range. In case that a sensor confidence is outside confidence acceptability range, said sensor confidence may be reduced to an extent that minimizes or eliminates the influence of the signals from said sensor in the determination of the positioning of the portable device. This may be seen as a provisional inhibition of the sensor (that is outside confidence acceptability range) as provider of sensor signals for determining the positioning of the portable device. In other words, signals from a sensor that is outside confidence acceptability range may be simply ignored to produce positioning results until "restoration" of its confidence within confidence acceptability range occurs.

In examples according to the series-coherence approach, a series of signals/values formed by signals (or positional data) from a particular sensor may be determined as being more or less coherent. An abnormality level of a series of sensor signals (or positional data) may be determined depending on e.g. a number of abnormalities in the series. Abnormalities may include e.g. outliers, exaggerated variations in signal values, gaps (signal absence) in the series, etc. Any known technique aimed at detecting outliers, exaggerated variations, signal gaps, etc. in a series may be used to determine an abnormality level of the series. For example, statistic techniques, machine learning techniques, etc. may be used for that purpose. The predefined models may further include expectedness models including predefined series of sensor signals (or positional data) satisfying predefined expectedness conditions. Abnormalities corresponding to outliers and/or signal values outside expectedness range and/or signal gaps may be determined by comparing corresponding series of sensor signals (or positional data derived from said sensor signals) with predefined series of sensor signals (or positional data) of corresponding expectedness models. A high abnormality level may indicate e.g. that signals are being significantly distorted, that the sensor has been damaged, etc. In this case, it may be concluded that these sensor signals (or positional data) are not reliable enough to be considered in the positioning functionality. Therefore, the confidence of the sensor may be decreased to a suitable extent such that its influence in positioning results is cancelled or minimized. On the contrary, if a low abnormality level (or high coherence level) is determined, the confidence of the sensor may be increased depending on the detected abnormality level. Said increase may be e.g. proportional to the lowness of the abnormality level. A verification of whether the abnormality level is within predefined abnormality acceptability range may be performed. In case of positive or true result of said verification, an increase may be induced in corresponding confidence. Otherwise, a decrease may be induced in corresponding confidence. The higher the abnormality level within predefined abnormality acceptability range is, the lower may be the induced increase. The lower the abnormality level within predefined abnormality acceptability range is, the higher may be the induced increase. The higher the abnormality level outside predefined abnormality acceptability range is, the higher may be the induced decrease. The lower the abnormality level outside predefined abnormality acceptability range is, the lower may be the induced decrease.

In examples according to the positional-comparison approach, respective series of positional data derived (by the modeller 106) from sensor signals produced by different sensors may be compared to each other (if they are comparable). This comparison may produce a deviation (or proximity) between the compared series of positional data. The deviation may be determined as inacceptable (or acceptable) depending on e.g. whether the deviation is outside predefined deviation acceptability range (or within predefined deviation acceptability range). If the deviation is determined as acceptable, corresponding confidences may be kept (substantially or completely) unvaried. If the deviation is inacceptable and one of the confidences is currently high (e.g. above predefined confidence threshold), the other confidence may be decreased. If the deviation is inacceptable but there is low difference or no difference between confidences (e.g. below predefined difference threshold), confidences may remain unaltered, or the lowest confidence may be minimally decreased, or one confidence or the other may be decreased depending on predefined top (or default) confidences attributed to different sensors, etc. For instance, it may be considered that gyroscope 103 is generally more reliable than magnetometer 101 to identify turns in a trajectory, so top confidence of the gyroscope 103 may be higher than top confidence of the magnetometer 101. Taking this into account, in case of inacceptable deviation and no (or insignificant) difference between the confidences of the gyroscope 103 and magnetometer 101, only the confidence of the magnetometer 101 may be decreased, since top confidence of the magnetometer 101 is lower than top confidence of the gyroscope 103. If this deviation is determined as being acceptable and one of the confidences is currently higher than the other, said other confidence may be increased. In any case, the reduction or increase to be applied to corresponding confidence(s) may depend on the detected deviation (or proximity). For example, the reduction/increase may be proportional to the detected deviation/proximity between positional data. In general, this "proportionality" principle may be applied to any confidence depending on any comparison between positional data of any nature. In an example wherein first and second positional data derived from signals respectively produced by first and second (one or more) sensors are compared, a determination may be performed of which of the first and second (one or more) sensors have higher or lower confidence in comparison with the other of the first and second (one or more) sensors. Then, the lower of said (one or more) confidences may be decreased proportionally to the detected deviation between the first and second positional data.

The comparison between series of positional data may have any type of cardinality: one-to-one, one-to-many and many-to many. The different series of positional data to be compared may be of same nature or represent same "positioning" concept to be comparable. For example, two series of positional data both representing trajectories are comparable to each other, but a first series representing positions and a second series representing orientations are not comparable to each other. One-to-one cardinality means that the comparison is performed between a first single series of positional data and a second single series of positional data. One-to-many cardinality means that the comparison is performed between a single series of positional data and a combination of several series of positional data. Many-to-many cardinality means that the comparison is performed between a first combination of several series of positional data and a second combination of several series of positional data. If several series to be compared reveal an acceptable divergence between them (according to e.g. a predefined divergence threshold or range), said several series may be combined into e.g. a single average series. Any average technique or approach may be used to obtain such a single average series which may participate in one-to-many or many-to-many comparison at any of the 'many' sides of said comparisons. This way, it is possible to compare two or more series of positional data derived from two or more sensors with the aim of adjusting corresponding confidences. Same or similar principles as those previously described with respect to comparison under one-to-one cardinality, may be applied in the case of one-to-many and many-to-many cardinalities.

A confidence may be determined as high (or low) depending on whether it is above (or below) a predefined confidence threshold or within (or outside) a predefined confidence range. A deviation may be determined as high (or low) depending on whether it is above (or below) a predefined deviation threshold or within (or outside) a predefined deviation range.

In particular examples according to one-to-one comparison approach, positional data determined from signals provided by the magnetometer 101 may be compared to positional data determined from signals produced by the gyroscope 103. In this case, positional data may represent turns or changes of direction/orientation in corresponding trajectory.

In other particular examples according to one-to-one comparison approach, positional data determined from signals provided by the accelerometer 102 may be compared to positional data determined from signals produced by Wi-Fi and/or Bluetooth sensor(s) 104, 105. In this case, positional data may refer to respective trajectories determined from accelerations and from Wi-Fi/Bluetooth intensities.

In further particular examples according to one-to-one comparison approach, positional data determined from signals provided by the Wi-Fi sensor 104 may be compared to positional data determined from signals produced by the Bluetooth sensor 105. In this case, positional data may refer to positions (e.g. 2D or 3D coordinates) and/or trajectories (e.g. vectors in 2D or 3D space), determined from Wi-Fi intensities and from Bluetooth intensities. Wi-Fi sensor 104 and Bluetooth sensor 105 may be generally denominated as wireless sensors. Any of said (series of) positional data including positions or trajectories may be generated by modelling sensor signals from corresponding wireless sensor through corresponding signal models including e.g. maps of signal strengths applicable to sensor signals of said wireless sensor. Any known method or technique aimed at calculating a trajectory from a series of positions over time may be used alternatively or additionally to corresponding signal models.

In still further particular examples, corresponding Wi-Fi (or Bluetooth) map may include a representation of known Wi-Fi/Bluetooth access points/beacons each being identified in the map by corresponding access point/beacon identifier (ID). The map may further represent predefined intensities that are presumably inducible by specific Wi-Fi/Bluetooth access points/beacons and, therefore, detectable by the portable device at corresponding locations (or regions) of the map. An intensity measured by the Wi-Fi/Bluetooth sensor(s) may be qualified as induced by one access point/beacon or another depending on a correspondence or equivalence between an ID in the map and an ID embedded in or coupled with corresponding Wi-Fi/Bluetooth signal. If a predefined intensity qualified in the map as inducible by a particular access point/beacon depending on such IDs equivalence is not acceptably matched by the measured intensity from said particular access point/beacon, a confidence of said particular access point/beacon may be accordingly decreased. A matching between a predefined intensity and a measured intensity may be considered acceptable if e.g. a deviation between the predefined intensity and the measured intensity is below predefined deviation threshold or is within predefined deviation range. Confidences associated to or with Wi-Fi/Bluetooth access points/beacons may be processed in a similar manner as confidences attributed to sensors are used in locational systems/methods according to the present disclosure.

According to the above principles, positional data may be derived from signals sensed by a particular wireless sensor from a particular Wi-Fi/Bluetooth access points/beacon. Positional data may also be derived from signals sensed by a particular wireless sensor from several Wi-Fi/Bluetooth access points/beacons that are within wireless range of the sensor. In other words, positional data may be generated at the level of Wi-Fi/Bluetooth access points/beacon sensed by a given wireless sensor. Any combination of signals from different Wi-Fi/Bluetooth access points/beacons sensed by the same wireless sensor or by different wireless sensors may also induce corresponding positional data. One-to-one or one-to many or many-to-many comparisons of either combined or non-combined positional data at the level of wireless sensor and Wi-Fi/Bluetooth access points/beacon may also be performed. These positional data determined at the level of wireless sensor and Wi-Fi/Bluetooth access points/beacon may correspond to positions of the portable device 100 and/or a trajectory followed by the portable device 100. Trajectory may be calculated depending on series of positions over time. These multiple possibilities of positional data generation and corresponding comparison may permit an even more powerful adjustment of confidences according to general principles described in other parts of the disclosure.

In general, different series or combination of series of positional data representing e.g. a trajectory (of the portable device 100) may be generated from signals produced by different sensors or different combination of sensors, so as to compare them and detect corresponding deviation(s) to be used for adjusting corresponding confidences. For example, trajectory data (a particular type of positional data) may be derived from one or more "walking" sensors (accelerometer 102, gyro-meter 103, magnetometer 101, etc.). Trajectory data may be also derived from one or more "wireless" sensors (Wi-Fi sensor 104, Bluetooth sensor 105, etc.). Trajectory and orientation data (another type of positional data) may be derived from one or more "walking" sensors and one or more "orientation" sensors (gyroscope 103, magnetometer 101, etc.). Trajectory and orientation data may be also derived from one or more "wireless" sensors and one or more "orientation" sensors. Any of said trajectory (and orientation) data with different origins (i.e. derived from different sensors or types of sensors) may be compared to each other for detecting corresponding deviation(s) and adjusting corresponding confidences depending on the detected deviations.

In any of the proposed matching-level, series-coherence and locational-comparison approaches, a weight applicable to positional data derived (by the modeller 106) from each of the affected sensors may be established depending on the confidence attributed to the sensor. The higher/lower the confidence is, the higher/lower may be the associated weight, respectively. This way, weights may hence be dynamically re-adjusted depending on corresponding dynamically re-adjusted confidences.

The combiner 107 may consider any combination of said dynamically re-adjusted weights for merging positional data derived from different sensors in the portable device (e.g. Wi-Fi, Bluetooth, accelerometer, gyroscope, magnetometer, etc.). For example, such a merging of positional data may include determining an average of the positional data (e.g.

position, trajectory . . . ) weighted according to the dynamically adjusted weights. Any other known suitable approaches may be used to merge positional data weighted according to the dynamically adjusted weights. For example, statistical techniques, probabilistic techniques, fuzzy techniques, etc. may be used for that purpose. Statistical techniques may include e.g. median determination, clustering-based techniques, etc. Probabilistic techniques may include e.g. Bayesian fusion. Fuzzy techniques may include e.g. application of fuzzy rules. The dynamic approaches proposed herein may produce more reliable/accurate positioning results in comparison with prior systems and methods, since confidences and weights are iteratively re-adjusted and taken into account in the merging of positional data.

The up/downloader 109 may be configured to upload data from portable device(s) to a cloud system (or similar), and to download data from the cloud system to portable device(s). Data in the KB 108 of a portable device may have its origin in the cloud system or in the portable device itself. Data originated in the cloud system may be downloaded to the portable device for its consideration by corresponding positioning method(s) performed at the portable device. Data originated in the portable device may be uploaded to the cloud system for its consideration by corresponding processes performed at the cloud system. All or part of the data in the KB 108 may be uploaded to the cloud depending on e.g. more/less restricted/relaxed data transmission requirements. For example, only data classified as most relevant may be uploaded to the cloud in order to minimize data transmission between portable device(s) and cloud. Data that may be uploaded and/or downloaded by the up/downloader 109 may include predefined models, (received) sensor signals, (determined) positional data and/or sensor confidences.

Uploaded data may be used at the cloud system to e.g. infer general conditions/conclusions that may generally affect a population of portable devices. For instance, a given sensor in a particular model of smartphone may be determined as non-reliable depending on (operational) data uploaded from the portable devices. The confidence of said sensor may be accordingly minimized or nulled for all the smartphones of such a model, and subsequently downloaded from the cloud system to said smartphones for its storage in the KB 108 of the smartphones. This way, corresponding positioning method(s) according to the present disclosure may consider said downloaded confidence for reducing the influence of said sensor in positioning results. In general, uploaded data (sensor signals, positional data and/or sensor confidences) from the whole or part of the population of portable devices may be used at the computing server (or cloud server) for adjusting one or more predefined models depending on said uploaded data. The up/downloader 109 may also be used to download any predefined model that has been adjusted at the computing/cloud server.

In other examples, a given Wi-Fi/Bluetooth access point/beacon (in a Wi-Fi/Bluetooth network) may be determined as e.g. removed/inexistent depending on (operational) data uploaded from a population of smartphones. In this case, corresponding Wi-Fi/Bluetooth map/model may be updated (at the cloud) to eliminate from the map said removed/inexistent Wi-Fi/Bluetooth access point/beacon and its influence in terms of e.g. Wi-Fi/Bluetooth intensities. Similarly, a previously unknown Wi-Fi/Bluetooth access point/beacon may be determined as e.g. new/incorporated depending on (operational) data uploaded from a population of smartphones. In this case, the Wi-Fi/Bluetooth map/model may be updated (at the cloud) to incorporate into the map said new Wi-Fi/Bluetooth access point/beacon and its influence in terms of e.g. Wi-Fi/Bluetooth intensities. The updated map may be subsequently downloaded for its deployment to affected smartphones. This way, positioning method(s) according to the present disclosure may produce positioning results based on the downloaded map without influence of removed access point(s) and with influence of new access point(s).

A known Wi-Fi/Bluetooth access point/beacon and its influence may be eliminated from the map if intensities presumably inducible by said access point/beacon have not been detected during a predefined lapse of time when, according to the map, said intensities should have been detected. An unknown Wi-Fi/Bluetooth access point/beacon and its influence may be incorporated into the map when enough data (both in volume and spatial coverage) have been collected representing new intensities attributable to said new access point/beacon. Similarly, if intensities detected in a given location or region that are presumably inducible by a particular access point/beacon show a deviation with respect to predetermined intensities defined in the map, said predetermined intensities may be updated in the map depending on the confidence(s) of corresponding sensor(s), estimated location or region, and detected intensities themselves.

According to examples, the pedometer function and/or the advance measurement function (performed by e.g. the modeller 106) may be trained at the cloud depending on data uploaded by a population of portable devices. As explained in other parts of the description, if signals from corresponding sensor(s) do not acceptably match any walking/advance model in the KB 108, the influence of said signals may be minimized or nulled in the production of positioning results. These "discrepant" sensor data may correspond to e.g. situations that have not been considered in previous trainings of the functionality and, therefore, may be uploaded as unknown data. Positioning results obtained from other sensors (and considered acceptable) may also be uploaded. Then, said unknown sensor data and said positioning results may be used at the cloud for training the pedometer (and/or advance measurement) functionality to infer new behaviours producing said positioning results from said unknown sensor data. Corresponding re-trained pedometer (and/or advance measurement) components, such as e.g. new version of the modeller 106, associated walking (and/or advance) models, etc. may be downloaded and deployed to corresponding population of portable devices.

Circumstances in which sensor data do not match any walking/advance model may correspond to e.g. when the portable device is carried in a pocket and pedometer/advance components have been trained with sensor data not corresponding to such a situation (portable device in a pocket). Pedometer/advance components may then be trained (at the cloud) with such unknown/unmatched sensor data (from corresponding sensors) and corresponding positioning results (derived from e.g. other sensors). This enrichment of pedometer/advance components, or any other enrichment such as the ones described in other parts of the disclosure, may be deployed once training has been performed with enough amounts and diversity of data representing a sufficient variety of situations. Supervised experiments may be performed by competent staff to check accuracy of the enriched components before corresponding deployment.

In some implementations, the adjustment of predefined models may be performed in the following manner. Sensor signals obtained from corresponding sensor(s) and representing outliers with respect to predefined sensor signals of corresponding predefined models may be identified. Concentrations or clusters of such outlier sensor signals may then be determined based on e.g. any known clustering technique/method. Then, corresponding predefined model(s) may be adjusted further depending on the determined concentrations of outliers with e.g. a concentration level that is above a predefined concentration threshold. Predefined outlier concentration patterns may be used to e.g. detect whether a given cluster of outliers corresponds to unknown elimination or inclusion of a wireless access point/beacon, in which case corresponding wireless intensities map (e.g. Wi-Fi/Bluetooth map) may be accordingly adjusted. Predefined outlier concentration patterns may also be used to e.g. detect unexpected conditions in walking or non-walking displacement scenarios, in which case corresponding walking/displacement model may be consequently adjusted. Similarly, orientation models, advance models, etc. may be adjusted depending on corresponding outlier concentration patterns.

In some examples, predefined models may also be adjusted locally at the portable device itself depending on sensor signals, positional data, sensor confidences, etc. stored in the knowledge base (KB) 108. Same or similar principles as those described with respect to the adjustment of predefined models at the remote/cloud server may be applied to this local adjustment approach based on local data.

The portable device 100 may further include, in some examples, a GPS sensor (not shown) which may be used to determine positional data in areas with no wireless network(s) based on e.g. Wi-Fi technology, Bluetooth technology, etc. The GPS sensor may be used to e.g. determine positional data when transitioning from an area without wireless network(s) into an area with wireless network(s), or vice versa. Continuity of the positioning functionality may be reliably assured in such "transitional" circumstances. In areas with both wireless network(s) and GPS coverage, wireless-based signals/data and GPS-based signals/data may cooperate (e.g. merged by the combiner 107) to implement the positioning functionality with improved accuracy.

The portable device 100 may further include, in some examples, a barometer (not shown) which may be used to determine changes in height in the case that a 3D framework is considered to implement the positioning functionality. Similarly as described with respect to the GPS sensor, barometer signals/data may cooperate with signals/data derived from other sensors to improve accuracy of the positioning functionality. Other wireless technologies (and corresponding sensors) such as e.g. Ultra-wideband (UWB), GSM or similar, etc. may be used to implement the positioning functionality in same or similar manner as herein described in detail with respect to other technologies (e.g. Bluetooth, etc.)

In the particular case of UWB technology, it may be usually based on measuring a distance to corresponding receiver(s) and/or an angle of reception of the signal at the receiver(s). A common technique may include measuring the time it takes the signal to travel from transmitter(s) to receiver(s) both having corresponding clocks suitably synchronized. In this case, UWB maps (another type of signal models) may be used in a similar way as described with respect to Wi-Fi/Bluetooth maps. However, UWB maps may define different locations (or regions) in the map that are qualified with e.g. particular UWB signal "travel" times and/or reception angles (instead of Wi-Fi/Bluetooth intensities or strengths). UWB maps may thus be divided into a plurality of UWB signal sub-models each corresponding to a location (or region) of the map defining positional data to be outputted and having expected (or predefined) UWB signal travel times and/or reception angles to be compared with UWB signal travel times and/or reception angles measured by corresponding sensors.

According to examples, at least some of the functionalities included in the portable device 100 may be automatically evolved according to machine learning technique(s), which may include e.g. supervised machine learning technique(s). For instance, the modeller 106 and/or the confidence adjustor 107 and/or the combiner 107 may continuously or periodically learn from any data stored in the KB 108 based on such machine learning technique(s). Data in the KB 108 that may be used to perform machine learning may include e.g. data produced by sensors 101-105, positional data produced by the modeller 106, confidences produced by the confidence adjustor 107, positioning results produced by the combiner 107, etc. Different components in the KB 108, such as e.g. Wi-Fi/Bluetooth maps, walking/displacement models, orientation models, advance models, etc. may also be updated (or evolved) according to such machine learning technique(s).

Any known machine learning technique(s) may be implemented in the portable device 100 with the self-learning aim(s) previously described. For example, the pedometer (and/or advance measurement) functionality may be implemented in a diversity of manners. In particular, any known neural network implementation, Support Vector Machine (SVM) implementation, classifier implementation, regression implementation, etc. or any combination of them may be trained to estimate walking steps (and/or movement advances, orientations, trajectories, etc.) depending on e.g. accelerometer signals and/or gyroscope signals and/or magnetometer signals, etc. measured over time.

Pedometer or advance-meter functionality may be even implemented not based on machine learning technique(s). In a particular example, an auto-correlation of the sensor signals may be determined and, if said auto-correlation results higher than a predefined auto-correlation threshold, it may be estimated that a walking step (and/or movement advance) has occurred. In a further particular example, it may be verified whether signal peaks greater than a first predefined signal threshold occurs followed by signal valleys less than a second predefined signal threshold, in which case a walking step (and/or movement advance) may be counted. In any case, estimated steps/advances may be counted to produce corresponding output.

Positional data may be also generated from previously produced positional data. For example, previously generated first and second (series of) positional data from first and second one or more sensors, respectively, may be used to generate third (series of) positional data based on said first and second (series of) positional data weighted depending on corresponding confidences of the first and second one or more sensors. Same or similar principles may be applied to generate a series of positional data from more than two pre-generated series of positional data.

In the context of different functions provided by positioning methods according to present disclosure, various comparisons between signals or values or series of signals/values have been proposed. These comparisons may be implemented in a diversity of manners, such as e.g. based on correlation technique(s), mutual information (MI), novelty/anomaly detection, outlier detection, etc. Any known technique(s) aimed at any of those purposes or combination thereof may be used in portable devices according to the present disclosure.

Positioning (computing) systems according hereto may be implemented by computing, electronics or a combination thereof. The computing hereof may be a set of instructions (that is, a computer program) and then the positioning (computing) system may include a memory and a processor, embodying said set of instructions stored in the memory and executable by the processor. The instructions may include functionality to execute positioning methods according to the present disclosure.

In case the positioning (computing) system is implemented only by electronics, the controller may be, for example, a CPLD (Complex Programmable Logic Device), an FPGA (Field Programmable Gate Array) or an ASIC (Application-Specific Integrated Circuit).

In case the positioning (computing) system is a combination of electronics and computing, the computing portion may be or include a set of instructions (e.g. a computer program) and the electronics may be or include any electronic circuit capable of implementing the corresponding method steps of the proposed positioning methods.

The computer program may be embodied on a storage medium (for example, a CD-ROM, a DVD, a USB drive, a computer memory or a read-only memory) or carried on a carrier signal (for example, on an electrical or optical carrier signal).

The computer program may be in the form of source code, object code, a code intermediate source and object code such as in partially compiled form, or in any other form suitable for use in the implementation of positioning methods. The carrier may be any entity or device capable of carrying the computer program.

For example, the carrier may include a storage medium, such as a ROM, for example a CD ROM or a semiconductor ROM, or a magnetic recording medium, for example a hard disk. Further, the carrier may be a transmissible carrier such as an electrical or optical signal, which may be conveyed via electrical or optical cable or by radio or other possibilities.

When the computer program is embodied in a signal that may be conveyed directly by a cable or other device or method, the carrier may be constituted by such cable or other device or method.

Alternatively, the carrier may be an integrated circuit in which the computer program is embedded, the integrated circuit being adapted for performing, or for use in the performance of, the relevant methods.

Figure 2:
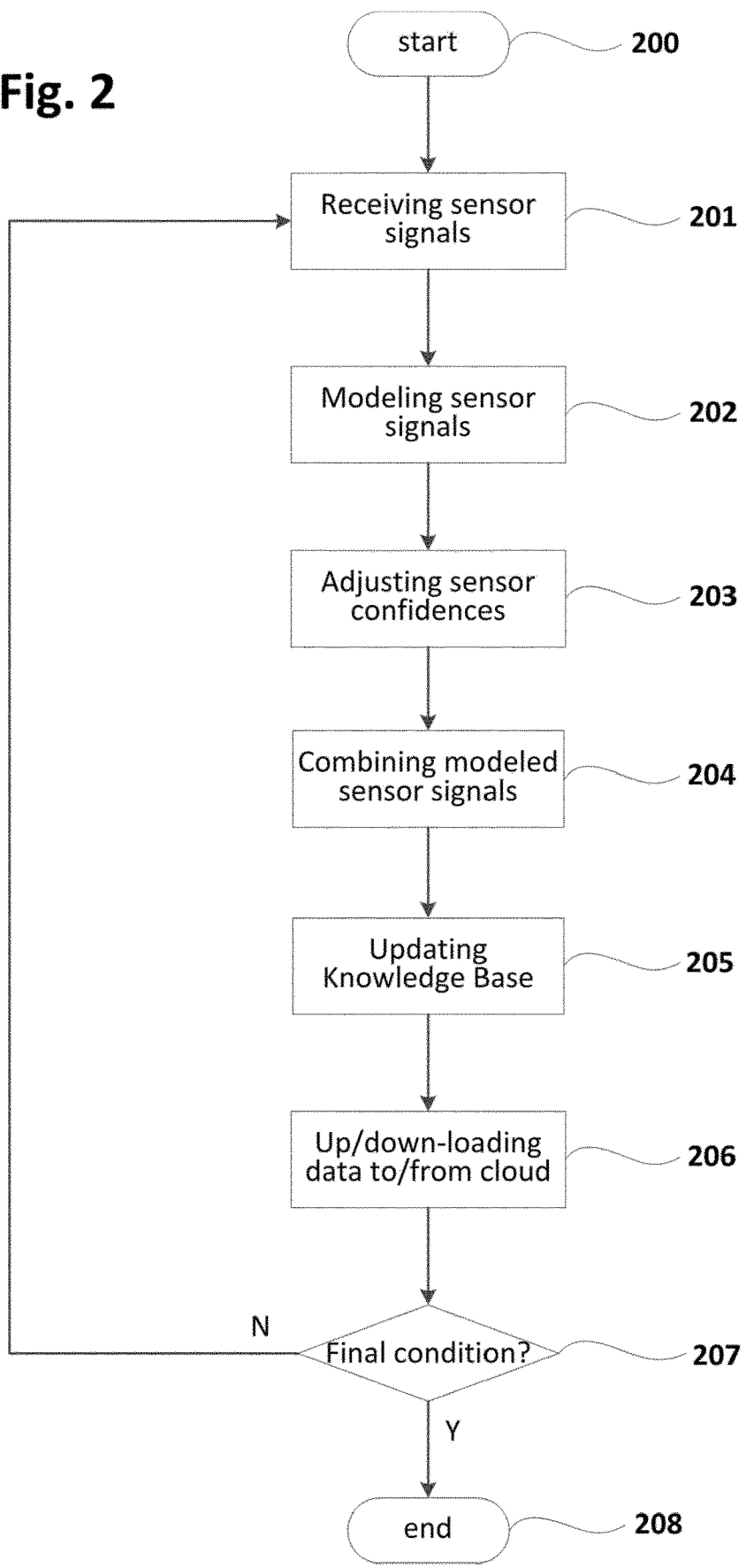
FIG. 2 is a flowchart schematically illustrating methods according to examples for determining a positioning of a portable device.

FIG. 2 is a flowchart schematically illustrating "positioning" methods according to examples for determining a positioning of a portable device. For the sake of better understanding, number references from FIG. 1 may be re-used in the following description of FIG. 2.

At initial block 200, the positioning method may be initiated as a result of (detecting) a starting condition such as e.g. an activation of the positioning functionality, an activation of the portable device, etc.

At block 201, sensor signals may be received from sensors 101-105 through corresponding signal receptor module (not shown in FIG. 1), and the received sensor signals may be provided to the signals modeller 106.

At block 202, the signals modeller 106 may model the received signals in any of the ways described in other parts of the disclosure. This modelling may produce corresponding positional data, which may be then provided to the confidence adjustor 107.

At block 203, the confidence adjustor 107 may compare the received positional data from block 202 to perform corresponding verifications according to any of the "matching-level", "series-coherence" and/or "positional-comparison" approach. The confidence adjustor 107 may also adjust corresponding confidences of corresponding sensors 101-105 depending on results of said verifications. Said verifications and adjustments may be performed in any of the manners described herein.

At block 204, the combiner 107 may weight (or attribute weights to) the positional data depending on the adjusted confidences and may combine said weighted positional data to determine the positioning of the portable device. This "combining" functionality may be performed according to any of the principles described in other parts of the disclosure.

At block 205, the knowledge base 108 may be updated with e.g. received signals, generated positional data, adjusted confidences, etc. in order to perform subsequent processes aimed at e.g. locally adjusting predefined models or transferring all or part of said data to another system for further processing.

At block 206, the Up/downloader 109 may upload all or part of the generated data from e.g. the knowledge base 108 to a remote or cloud system, so that said remote or cloud system may process said data along with data from other portable devices to e.g. adjust predefined models affecting to the whole or part of a population of portable devices. The Up/downloader 109 may also download data from the remote or cloud system, such as e.g. predefined models that have adjusted at the remote or cloud system.

At block 207, a verification of whether a final condition is satisfied may be performed. In case of positive or true result of said verification, the positioning method may continue to final block 208. In case of negative or false result of said verification, the positioning method may loopback to previous block 201 to initiate a new iteration of the method. The final condition may be caused by e.g. a deactivation signal of the positioning functionality, deactivation of the portable device, etc.

At block 208, the method may be terminated by e.g. providing positioning results, emitting warnings due to anomalous conditions detected during execution of the method, freeing volatile memory, switching the positioning functionality to standby state, etc.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow.

The invention claimed is:

1. A method for determining a positioning of a portable device comprising a plurality of sensors including first one or more sensors and second one or more sensors, each of the sensors in the plurality of sensors having a corresponding confidence, the method comprising:
sensing first sensor signals by at least a first one of the first one or more sensors and sensing second sensor signals by a second one of the second one or more sensors; and,
by a processor
receiving the first and second sensor signals from the plurality of sensors;
generating positional data including first and second positional data respectively from the first and second sensor signals, said positional data representing positional conditions of the portable device, by modelling the received sensor signals based on one or more predefined models including one or more signal models defining a correspondence between predefined sensor signals and predefined positional data;

comparing the first positional data with the second positional data to determine a difference between the first and second positional data;

adjusting, for each of the first and second one or more sensors, the corresponding confidence of the corresponding sensor by determining an adjusted confidence value depending on the corresponding confidence value of the sensor and the determined difference between the first and second positional data;

weighting the generated positional data depending on one or both the corresponding or the adjusted confidences of the corresponding sensors in the plurality of sensors; and determining the positioning of the portable device based on the weighted generated positional data.

2. A method according to claim 1, each of the sensors in the plurality of sensors corresponding to one of the following types of sensors: accelerometer, gyroscope, magnetometer, Wi-Fi sensor, Bluetooth sensor.

3. A method according to claim 1, the positional conditions of the portable device including one or more of: positions and/or orientations and/or walking steps and/or trajectory and/or displacement of the portable device.

4. A method according to claim 1, the adjusting the confidences of the first and second one or more sensors comprising determining which of the first and second one or more sensors have higher or lower confidence in comparison with the other of the first and second one or more sensors, and decreasing the lower of the confidences proportionally to the difference between the first and second positional data.

5. A method according to claim 1, the adjusting the confidences of the first and second one or more sensors comprising determining whether the difference between the first and second positional data is within a predefined deviation acceptability range, in which case the confidences are kept substantially unvaried.

6. A method according to claim 1, the modelling the received sensor signals comprising for each of the sensors in the plurality of sensors, determining which of the signal models best matches the signals from the sensor depending on a comparison between the signals from the sensor and the predefined sensor signals of corresponding signal models, and determining a matching level of said best matching signal model; and the adjusting the confidences of the first and second one or more sensors comprises adjusting, for each of the first and second one or more sensors, the confidence of the sensor further depending on corresponding matching level.

7. A method according to claim 6, further comprising determining whether the matching level is within a predefined matching acceptability range, in which case an increase is induced in the confidence, or outside a predefined matching acceptability range, in which case a decrease is induced in the confidence.

8. A method according to claim 7, the higher the matching level within a predefined matching acceptability range is, the higher the induced increase is; and the lower the matching level within a predefined matching acceptability range is, the lower the induced increase is.

9. A method according to claim 7, the higher the matching level outside a predefined matching acceptability range is, the lower the induced decrease is; and the lower the matching level outside a predefined matching acceptability range is, the higher the induced decrease is.

10. A method according to claim 1, further comprising
determining whether the first positional data includes a first series of positional data with abnormalities, and whether the second positional data includes a second series of positional data with abnormalities, said abnormalities corresponding to one or more of outliers and/or signal values outside an expectedness range and/or signal gaps in the corresponding series; and determining, for each of the first and second series of positional data, an abnormality level depending on the abnormalities detected in the series; and adjusting the confidence of each of the first and second one or more sensors comprises adjusting, for each of the first and second one or more sensors, the confidence of the corresponding sensor further depending on corresponding abnormality level.

11. A method according to claim 10, the predefined models further including expectedness models including predefined series of positional data satisfying predefined expectedness conditions; and the abnormalities corresponding to one or more of outliers and/or signal values outside the expectedness range and/or signal gaps are determined by comparing corresponding series of positional data to predefined series of positional data of the corresponding expectedness models.

12. A method according to claim 10, further comprising determining whether the abnormality level is within a predefined abnormality acceptability range, in which case an increase is induced in the confidence, or outside a predefined abnormality acceptability range, in which case a decrease is induced in the confidence.

13. A method according to claim 12, the higher the abnormality level within a predefined abnormality acceptability range is, the lower the induced increase is; and the lower the abnormality level within a predefined abnormality acceptability range is, the higher the induced increase is.

14. A method according to claim 12, the higher the abnormality level outside a predefined abnormality acceptability range is, the higher the induced decrease is; and the lower the abnormality level outside a predefined abnormality acceptability range is, the lower the induced decrease is.

15. A method according to claim 1, further comprising
verifying, for each of the first and second one or more sensors, whether the confidence of the corresponding sensor is outside a predefined confidence acceptability range, in which case the confidence of the sensor is reduced to an extent that minimizes or eliminates the influence of the signals from said sensor in the determination of the positioning of the portable device.

16. A method according to claim 1, further comprising storing at least some of one or more of the predefined models, received sensor signals, determined positional data and/or sensor confidences in a knowledge base or repository.

17. A method according to claim 16, further comprising adjusting at least some of one or more of the stored predefined models depending on at least some of the received sensor signals, determined positional data and/or sensor confidences stored in the knowledge base.

18. A method according to claim 1, the weighting the generated positional data comprising weighting the generated positional data with respective weights each depending on the confidence of corresponding sensor in the plurality of sensors such that the higher the confidence of a sensor is, the higher the corresponding weight is determined, and the lower the confidence of a sensor is, the lower the corresponding weight is determined.

19. A computer program comprising program instructions for causing a computing system to perform a method according to claim 1 for determining a positioning of a portable device.

20. A computing system for determining a positioning of a portable device, the computing system comprising a memory and a processor, embodying instructions stored in the memory and executable by the processor, the instructions comprising functionality to execute a method according to claim 1 for determining a positioning of a portable device.

\* \* \* \* \*